(12) United States Patent
Petsch et al.

(10) Patent No.: US 8,115,792 B2
(45) Date of Patent: Feb. 14, 2012

(54) LASER MARKING METHOD, LASER MARKING APPARATUS AND OPTICAL ELEMENT

(75) Inventors: Tino Petsch, Chemnitz (DE); Bernd Keiper, Burgstaedt (DE); Sven Albert, Penig (DE); Thomas Hoeche, Halle (DE)

(73) Assignee: 3D-Micromac AG (DE)

( * ) Notice: Subject to any disclaimer, the term of this patent is extended or adjusted under 35 U.S.C. 154(b) by 345 days.

(21) Appl. No.: 12/606,642

(22) Filed: Oct. 27, 2009

(65) Prior Publication Data

US 2010/0141729 A1  Jun. 10, 2010

(30) Foreign Application Priority Data

Oct. 29, 2008  (DE) .................. 10 2008 056 136

(51) Int. Cl.
- *B41M 5/26* (2006.01)
- *B23K 26/00* (2006.01)
- *G02B 1/12* (2006.01)
- *G02C 7/02* (2006.01)

(52) U.S. Cl. ...................... 347/224; 351/177

(58) Field of Classification Search .............. 347/224, 347/225; 219/121.68, 121.69, 121.83; 351/41, 351/159, 177

See application file for complete search history.

(56) References Cited

U.S. PATENT DOCUMENTS

| | | |
|---|---|---|
| 2,746,193 A | 5/1956 | Billian |
| 4,219,721 A | 8/1980 | Kamen et al. |
| 4,619,504 A | 10/1986 | Daniels et al. |
| 4,912,298 A | 3/1990 | Daniels et al. |
| 5,604,635 A | 2/1997 | Lawandy |
| 5,665,136 A | 9/1997 | Komachi |
| 5,767,483 A | 6/1998 | Cameron et al. |
| 6,075,223 A | 6/2000 | Harrison |
| 6,491,393 B1 | 12/2002 | Appleton |
| 6,857,744 B2 * | 2/2005 | Nakada et al. ............. 351/177 |
| 7,267,436 B2 * | 9/2007 | Ito et al. .................... 351/177 |
| 2004/0032566 A1 | 2/2004 | Nakada et al. |
| 2005/0046792 A1 | 3/2005 | Ito et al. |

FOREIGN PATENT DOCUMENTS

| | | | |
|---|---|---|---|
| DE | 237972 A3 | 8/1986 | |
| DE | 3534920 A1 | 5/1987 | |
| DE | 4405203 A1 | 8/1995 | |
| DE | 102004004514 A1 | 8/2005 | |
| EP | 2184127 | * 5/2010 | |
| JP | 7-186290 A | 7/1995 | |
| JP | 2003-156667 A | 5/2003 | |
| WO | 03/033199 A1 | 4/2003 | |

* cited by examiner

*Primary Examiner* — Huan Tran
(74) *Attorney, Agent, or Firm* — Akerman Senterfitt

(57) ABSTRACT

In a method for producing a permanent mark in an optical element which consists essentially of a material that is transparent in the visible spectral region, a marking region of the optical element is irradiated with laser radiation in order to generate local, near-surface material changes in such a way that a mark of prescribed shape and size is generated. The laser radiation has an operating wavelength λ from the wavelength region between 1.1 μm and 9.2 μm. A thulium-doped fiber laser is preferably used as laser radiation source. The operating wavelength is selected in dependence from the material of the optical element such that the material exhibits a partial absorption with a transmittance between 60% and 98%. The method can be used, in particular, to provide spectacle lenses, contact lenses or intraocular lenses with marks.

26 Claims, 7 Drawing Sheets

LASER MARKING METHOD, LASER MARKING APPARATUS AND OPTICAL ELEMENT

The following disclosure is based on German Patent Application No. 10 2008 056 136.3 filed on Oct. 29, 2008, which is incorporated into this application by reference.

BACKGROUND OF THE INVENTION

1. Field of the Invention

The invention relates to a method for producing a permanent mark in an optical element which consists essentially of a material that is transparent in the visible spectral region, and to an apparatus suitable for carrying out the method and to an optical element that can be produced with the aid of the method or the apparatus. A preferred field of application is the marking of spectacle lenses and other transparent optical elements for ophthalmics.

2. Description of the Related Prior Art

When being produced, spectacle lenses, which, irrespective of the material, are often also referred to as spectacle glasses are mostly provided with one or more permanent marks. A mark can include, for example, information relating to the manufacturer, a batch number or characteristics of optical elements. It is also possible to provide marks for identifying optical axes, centering points or other items of information defining the type of lens in order, for example, in the case of progressive lenses for the optician to be able to fit the spectacle lens acceptably into the spectacle frame provided therefor. Such marks are generally to be semivisible to the spectacle wearer or during normal use of the spectacles, and can have correspondingly small dimensions. Marks can also be located in a peripheral region of the spectacle lens which is severed during the fitting into the spectacle frame. Such marks can also be visible. Again, other materials that are transparent in the visible spectral region are sometimes provided with marks, for example lenses for multi-lens optics. In cases of interest here, a permanent mark is desired in order to ensure traceability.

Initially, marks were generated in a purely mechanical way by engraving (for example DE 35 34 920 C2). It is also known to generate marks in the form of etched marks by leeching out glass components after covering the areas which are not to be marked, for example with the aid of a lacquer. EP 0 103 217 describes the production of spectacle lenses with a reflection-reduction layer, a mark being generated in the reflection-reduction layer in the form of a cutout.

Soon after the commercial availability of lasers, a shift was made to using irradiation with high-energy laser radiation for the purpose of changing objects near the surface which are transparent in the visible spectral region such that permanent, visible marks are produced. This approach is set forth, for example, in U.S. Pat. No. 2,746,193 with reference to the example of the marking of glassware.

Given not excessively high power densities of the laser radiation and not excessively short pulses of the laser radiation, a near-surface removal of material which can lead to a visible, permanent mark is possible only when the material to be processed at least partially absorbs the laser wavelength used, that is to say is not completely transparent or completely free of absorption in the region of the operating wavelength of the laser radiation. Since the materials used for spectacle lenses scarcely absorb in the visible spectral region (typically between approximately 380 nm and 710 nm), and frequently also in adjacent spectral regions of ultraviolet radiation and/or infrared radiation, in the field of the marking of spectacle lenses specific use has been made of laser radiation whose operating wavelength lies clearly outside the visible spectral region.

Patent EP 0 307 874 B1 describes, for example, the use of an excimer laser with an operating wavelength of approximately 193 nm for the purpose of generating a mark in an anti-reflection layer system in such a way that the mark is visible only in reflected light. Since in the case of laser wavelengths of 193 nm or 248 nm such as are generated by excimer lasers ultraviolet light reacts aggressively with atmospheric oxygen to form ozone and thereby experiences an attenuation of the laser intensity, DE 10 2004 004 514 A1 proposes an apparatus for signing or marking spectacle lenses in the case of which the laser beam of an excimer laser is guided through a housing which is filled with a protective gas which does not react with the laser beam.

Japanese patent application with the publication number JP 2003 156667 AA describes the use of a frequency-multiplied solid state laser whose operating wavelength likewise lies in the ultraviolet spectral region because of the frequency multiplication.

Another class of laser apparatuses for marking spectacle lenses and comparable objects made from materials that are transparent in the visible spectral range makes use as light source of $CO_2$ lasers which emit in the middle infrared region. By way of example, it is proposed in U.S. Pat. No. 4,219,721 to mark plastics lenses based on polymethyl methacrylate (PMMA) with the aid of infrared radiation from the wavelength region around 10.6 µm.

It is proposed in U.S. Pat. No. 5,767,483 to use $CO_2$ lasers for the purpose of marking glass and other materials of comparable thermal conductivity.

A further known approach is to apply to the surface to be marked a thin layer which absorbs particularly strongly in a spectral region well covered by conventional lasers, and subsequently to irradiate it locally, as a result of which the absorption layer experiences a locally adhesive connection to the substrate. Such an indirect method is disclosed, for example, in U.S. Pat. No. 6,075,223.

It is likewise known to mark contact lenses by means of laser radiation (for example EP 946 896 B1). It is also known to generate marks in casting moulds for the production of contact lenses by means of laser radiation (JP 7186290A). In the last case, raised marks are produced on the contact lenses resulting from casting as negative moulds of the depressions generated by means of laser radiation.

SUMMARY OF THE INVENTION

It is an object of the invention to provide a laser marking method which is suitable, in particular, for marking spectacle lenses, contact lenses or intraocular lenses and with the aid of which it is possible to generate relatively cost-effectively high-precision, permanent, near-surface marks on optical elements made from materials that are transparent in the visible spectral region.

As a solution to these and other objects, the invention, according to one formulation, provides a method for producing a permanent mark in an optical element which consists essentially of a material that is transparent in the visible spectral region, the method comprising: irradiating a marking region of the optical element with laser radiation to generate local, near-surface material changes in such a way that a mark of prescribable shape and size is generated; wherein the laser radiation has an operating wavelength λ from the wavelength region between 1.1 µm and 9.2 µm; the operating wavelength being selected such that the material of the optical element exhibits a partial absorption with a transmittance between 60% and 98%.

Advantageous developments are specified in the dependent claims. The wording for the claims has been incorporated in the description by reference.

In the method, a marking region of the optical element is irradiated with laser radiation in order to generate local, near-surface material changes in such a way that a mark of prescribable shape and size is produced. The laser radiation has an operating wavelength $\lambda$ from the wavelength region between 1.1 µm and 9.2 µm.

In accordance with another formulation of the invention, it is proposed to use a laser with an operating wavelength $\lambda$ from a wavelength region between 1.1 µm and 9.2 µm as light source for the laser microprocessing apparatus for marking spectacle lenses and other optical elements which consist essentially of a material that is transparent in the visible spectral region.

In this application, the term "marking" generally denotes a near-surface structuring which is visible with the naked eye or with the aid of suitable optical aids, for example a magnifying glass or a microscope. The terms "marking" and "structuring" are therefore used synonymously from time to time.

In contrast with the conventionally used wavelength regions from the deep ultraviolet or from the middle infrared region, laser processing with operating wavelengths from the wavelength region between 1.1 µm and 9.2 µm has numerous advantages. Firstly, it has been realized that many materials used for spectacle lenses, contact lenses, intraocular lenses and other transparent optical elements have spectral regions of advantageous partial absorption in this wavelength region such that, given suitable selection of the operating wavelength, it is already possible for relatively low radiated power densities to suffice for bringing about a permanent laser-induced material change in the material. Since the laser-induced material changes in the material of the optical element are generated under these conditions, it is possible to dispense with the use of auxiliary layers for increasing the near-surface absorption.

Secondly, it is possible to use laser processing systems of relatively simple design. This is advantageous, in particular, by contrast with conventionally used excimer lasers. Excimer lasers have, inter alia, the disadvantage that the gas medium must be refreshed at regular intervals, and that the power drops monotonically after each refilling, and this requires a continuous power measurement and regulation in order to be able to apply marks with constant power densities. Moreover, at short wavelengths, for example at 193 nm, the radiation of ultraviolet lasers is absorbed in air, and so there is a need for an outlay on design in order to guide the beam path through a protective gas (compare, for example, DE 10 2004 004 514 A1) or in vacuo. In addition, excimer lasers are pulsed lasers with typical repetition rates in the range of a few 100 Hz, and this restricts productibility. Consequently, dispensing with excimer lasers permits savings on outlay and investment costs.

Substantial advantages also accrue by comparison with the conventionally used $CO_2$ lasers. It is true that no continuous power drop occurs in the case of $CO_2$ lasers, because the laser gas is continuously refreshed. However, when use is made of $CO_2$ lasers for marking tasks in the near-surface region of materials that are transparent in the optical spectral region, it has been recognized as a disadvantage that the emitted output power can fluctuate by up to 5% about a mean value, and this can lead to problems in maintaining and setting prescribed modification dimensions, since the number of the pulses required to achieve a given material change is calculated as a rule on the assumption of a constant emission characteristic.

The use of operating wavelengths from the middle infrared region as are output by $CO_2$ lasers can also be disadvantageous with regard to a possible desired miniaturization of structural elements of marks, since the dimensions of the structures minimally capable of being generated are determined by the optical resolution $\Delta x$ which is, in turn, related to the operating wavelength $\lambda$ and the numerical aperture NA via the functional relationship $\Delta x=0.61*\lambda/NA$. Consequently, a resolution of better than approximately 6 µm cannot be achieved in the case of operating wavelengths beyond 9.2 µm under typical beam guidance conditions. If, by contrast, substantially shorter operating wavelengths from the infrared region are used, marks with finer structures, and/or very sharp-edged marks are possible.

The operating wavelength preferably lies in the lower part of the specified wavelength region, the laser radiation being capable, for example, of having an operating wavelength from the wavelength region between 1.5 µm and 5.0 µm. The absorption activity of the material to be changed locally can be used, in particular, as selection criterion in conjunction with the appropriate wavelength. When the emission wavelength originates from the lower part of the spectral region, the result is a substantially improved focusability by comparison with $CO_2$ laser wavelengths, the result being to enable structures with finer and/or smaller structural elements suitable as marks. With regard to work safety, as well, operating wavelengths of more than approximately 1.4 µm are advantageous, since devices for eye protection can be less expensive than for lower wavelengths, because retinal damage is scarcely still to be feared, for example.

Research by the inventor has shown that it can be advantageous for processing a specific material to use laser radiation with an operating wavelength for which the material is neither completely transparent nor very strongly absorbing, but merely exhibits a certain partial absorption. In particular, it is proved to be advantageous when the transmittance or transmittivity of the irradiated material for the laser radiation used lies between approximately 60% and approximately 98%, in particular between approximately 75% and approximately 95%. These conditions provide an advantageous compromise between the optical penetration depth of the laser radiation into the material (promoted by low absorption) and the absorption required for the targeted material change, and so it is possible to achieve the threshold fluence (limiting power density for the generation of an irreversibly (lasting), optically detectable material change) necessary for the material modification even given a not excessively high output power of a laser radiation source in the material.

Particular advantages can accrue when the material of the optical element is a plastics material, that is to say a synthetic polymer material. By way of example, the plastics material can be polycarbonate (PC), polymethyl methacrylate (PMMA), an acryl possibly containing water (in particular for intraocular lenses), or another polymer which is suitable from the points of view of use as a spectacle lens.

By way of example, according to research by the inventor the plastic polycarbonate (PC) has a partial absorption with a transmittance between approximately 75% and approximately 98% in the wavelength region between approximately 1.5 µm and approximately 5 µm, and can therefore be modified very efficiently with wavelengths from the near infrared region. Polymethyl methacrylate (PMMA) has a slightly lower transmission in the same wavelength region, the transmittance being capable of lying between approximately 70% and approximately 98%. When use is made of other plastics materials that are transparent in the visible spectral region, similar conditions can occur as a function of the refractive index of the material, the transmittance being capable, for example, of lying between approximately 55% and approximately 80% to 98%.

The irradiation parameters can be set so as to produce a material removal (ablation) in the irradiated region such that near-surface depressions of prescribable shape and depth result.

A particular method variant is distinguished, by contrast, in that the optical element consists essentially of a plastics material, at least in the region to be modified, and that beam parameters of the laser radiation are set in such a way that a laser-induced increase in volume is generated in the irradiated near-surface region. The generated structural elements of a mark are then raised by comparison with the adjacent, non-irradiated regions. It has emerged that it is possible to avoid removing material entirely under certain irradiation conditions such that no debris (removal products) which could soil the marked surface is produced. It is currently assumed that under the influence of the irradiated laser radiation the plastics material swells and/or possible also partially fuses and hardens again upon termination of the irradiation so as to produce in the near-surface irradiation region a zone of reduced density or increased volume when compared with before the irradiation. This method variant can therefore be denoted as "laser swelling" or "laser expansion".

If the irradiated power density is suitably limited (for example by limiting the number of pulses), the irradiated region can contain a largely undamaged surface which extends smoothly and continuously curved over the region of increased volume in the manner of a skin. A lens element with a convex lens surface can be generated in this way in an irradiated region. If irradiation regions lying parallel to one another in time, and/or lying sequentially juxtaposed in large numbers are irradiated, it is possible to form a one-dimensional or a two-dimensional microlens array having a multiplicity of raised structural elements juxtaposed in a lattice arrangement which respectively form a lens of the microlens array.

The raised structural elements can be generated on the uncoated surface of an optical element. The structured or marked optical element can thereafter be coated as required, for example with an anti-reflection coating and/or with a wear protection layer, in order to increase the scratch resistance. However, it is also advantageously possible to provide the optical element firstly with a coating covering the region to be structured (for example anti-reflection coating and/or wear protection layer), and thereafter to generate the raised laser-induced mark or structure through the coating. Given suitable selection of the irradiation parameters, it is possible in this case for the raised structural elements to form without the coating becoming cracked or peeling off. For this variant, the coating should consist of one or more materials which, on the one hand, are substantially transparent and/or largely free of absorption for the operating wavelength of the laser radiation, so that the coating does not heat up excessively during structuring or marking and, on the other hand, have a modification threshold fluence which lies substantially above that of the substrate material. This combination of properties is frequently observed in the coating of plastic substrates with inorganic layers or layer systems.

In some embodiments, the raised structural elements of the mark have a height relative to the non-irradiated surroundings which can be of the order of magnitude of 100 or several hundred nanometres, for example in the range from approximately 0.5 μm to approximately 5 μm or more. Given a suitably set lateral extent, such structural elements can serve as virtually invisible, or else as visible marks and/or as lens elements. The diameter or the lateral extent typically lies in the range between approximately 10 μm and 500 μm, in particular between approximately 20 μm and 100 μm, but can also lie thereabove or therebelow if required.

The material modification can be carried out with a pulsed laser radiation source which has a repetition rate in the kHz region, the repetition rate can, for example, lie between 2 kHz and 80 kHz. These repetition rates lie substantially above the pulse repetition rates achievable by excimer lasers, which normally lie in the range from 100 Hz to at most 500 Hz. It is thereby possible to attain, however, higher processing rates (individual mark per time unit), and thus an improved productivity.

A mark can be generated by means of direct structuring or mask projection methods. In the case of direct structuring (which can also be denoted as focal removal), a laser beam is generated that is focused in a focal region. The marking region of the optical element to be irradiated is irradiated with the laser beam focused in the marking region in order to generate local, near-surface material changes. In this process, a relative movement between the optical element and the focal region of the laser beam is generated such that the focal region sequentially irradiates different locations of the optical element, and that a mark of prescribable shape and size is generated in this way. This sequential method is very flexible, and so different marks can be generated in conjunction with a low outlay. If required, the laser beam can be focused in a focal region with a diameter of less than 20 μm, it thereby being possible to generate very fine structures.

In the case of mask projection methods, there is introduced in the beam path in the region of the object plane of an imaging optics a beam-shaping mask which is projected into the image plane of the imaging optics on a reducing scale with the aid of said imaging optics. This produces a sharp, reduced image of the mask structure in the image plane, which is also denoted as mask projection plane. For example, if the mask has a single circular cutout, the laser beam then has a correspondingly smaller circular beam cross section in the mask projection plane. By generating a relative movement between the optical element and the laser beam projected onto its surface, it is possible by analogy with direct structuring to generate a mark by sequential irradiation of different locations of the marking region. It is frequently possible with the aid of the mask projection method to realize the primary radiation energy of the laser more efficiently, since the radiation energy can, if required, be projected onto larger regions, for example with diameters between 50 μm and 100 μm, as a result of which sharp-edged marking structures can be generated which can still be visible to the naked eye without aids. When use is made of more complex masks, it is also possible with the aid of the mask projection method to generate a more complex mark in the object surface, if appropriate with a plurality of structural elements, doing so with a single laser pulse or a few laser pulses.

The spatial lateral extent and distribution of the material changes can therefore be set in wide limits by suitable beam profile adjustment. For example, masks with round or polygonal or otherwise shaped cutouts of different shape and size can be used in the mask projection method. Again, the number of cutouts can be varied, and it is possible to provide one or more cutouts per mask. By way of example, in order to produce microlens arrays use can be made of masks with a lattice arrangement of suitably dimensioned cutouts, in order to generate a multiplicity of microlenses in a temporally parallel fashion.

Alternatively or in addition to a precise prescription of the cross-sectional shape of the laser beam, in some method variants an intensity distribution of the laser radiation is influenced within the laser beam by beam shaping. Use is preferably made for this energy beam shaping of a beam shaping device having at least one beam shaping element selected from the group of: contour mask, grey-scale mask, refractive optical element (ROE) and diffractive optical element (DOE). A laser system suitable for carrying out this method variant therefore has such a beam shaping device.

The targeted setting of the intensity distribution in the laser spot can be used, for example, to achieve softer transitions between the irradiated region of a mark and adjacent non-irradiated regions of the optical element. Such softer transitions can, for example, simplify and improve marking through a coating, because the tendency of the coating to peel off is reduced given generation of softer and/or smoother transitions between irradiated and non-irradiated regions which are approximately or completely continuous. The increase in volume generated by the partial absorption of the laser radiation can thereby follow without a sharp transition to the surrounding, non-irradiated regions such that structures with high spatial frequencies such as are normally observed in the case of laser ablation processes are more effectively evened out.

The use of a transmission mask designed as a contour mask is, as a rule, a particularly simple and economic measure for actively influencing the energy beam profile. A transmission mask essentially consists only of sections of the mask which are completely transparent and completely nontransparent to radiation (opaque). However, whereas a conventional transmission mask has essentially rectangular transmission profile with a sharp transition at the edge of the hole or of the transparent region of the mask, the edge regions of the completely transmitting region can, for example, be configured by zigzag structures, or by further transparent regions of different spatial density and/or size so as to result in a substantially softer transition between regions of complete transmission and regions of complete beam blockage. Grey-scale masks are somewhat more complicated to produce, but if required they do however permit all transition values between 100% and 0% to be set over the cross section of the beam cross section being influenced. Grey-scale masks and transmission masks can, of course, also be combined in order to obtain a desired intensity distribution in the laser spot on the workpiece.

When use is made of one or more refractive optical elements (ROE) in the beam shaping device, the intensity profile of the laser beam can be influenced by targeted refraction of the laser beam in order, for example, to generate a top hat profile from a Gaussian energy beam profile in a way that is refracted and substantially without transmission losses. A beam shaping device can also include one or more diffractive optical elements (DOE) for actively influencing the intensity distribution within the laser beam. For example, an appropriately designed diffractive optical element can be used to attain rectangular or other polygonal beam cross-sectional shapes on the optical element in a simple way. It is also possible for relatively complex patterns such as, for example, letters, numerals or other characters to be generated in a diffractive way.

Laser marking with the aid of such beam shaping elements can be carried out in a stationary or kinematic fashion.

In the case of a stationary procedure, it is possible, for example, to shape the intensity profile in the laser beam such that it is substantially annular. In contrast to a Gaussian beam intensity profile, an annular intensity profile can be used, for example, to generate concave microlenses in swellable optical materials, for example plastics.

The kinematic procedure utilizes a given beam profile, and the optical element is continuously irradiated while a relative movement is generated between the laser beam and the optical element. It is possible in this way for a prescribed relatively simple intensity distribution in the laser beam to be transformed into a two-dimensional extended marking structure, for example in the form of a microramp. It is possible in the course of kinematic processing to vary the laser beam profile as a function of position and/or time during the relative movement, doing so, for example, by varying the width and height of a motor-driven rectangular adjustable mask in a fashion synchronous with processing along a processing trajectory. For example, the mask can be completely closed ahead of the start of a processing track, and be slowly opened at the beginning of the marking process, thereafter remain open for a while and be gradually or quickly closed towards the end of the processing. A high flexibility in the marking of optical elements is thereby possible.

Operating wavelengths from the wavelength region between 1.1 µm and 9.2 µm, in particular from the lower part of this spectral region up to at most, for example, 5000 nm (5 µm) can be achieved by way of example by the use of a solid state laser emitting in this spectral region, or by varying the wavelength of a seed laser, emitting at a certain wavelength, by means of an optical parametric amplifier (OPA) or by the use of an optical parametric oscillator (OPO).

Particular advantages result when a fibre laser is used as laser radiation source. Fibre lasers have, inter alia, an excellent beam quality (typically: $M^2$=1.05 to 1.1), and this chiefly promotes focusability, and thus the quality and reproducibility of marking. Moreover, they have a long-term stable emission characteristic, are compact and therefore best suited to industrial use.

In one embodiment, a thulium-doped fibre laser is used whose typical operating wavelength lies in the range from approximately 2 µm or slightly thereunder, in particular in the range between approximately 1.75 µm and approximately 2.1 µm. It is also possible, for example, to use an erbium-doped fibre laser or a holmium-doped fibre laser. It has emerged that many materials used for spectacle lenses, contact lenses or intraocular lenses, for example polycarbonate (PC) or PMMA or another acrylic material, have in the spectral region of these lasers a partial absorption advantageous for laser marking, for example with transmittances between approximately 60% and approximately 98%.

The method can be carried out by making general use of the following laser radiation sources, for example:

an Ho-YAG laser (holmium-YAG laser) with operating wavelength or emission wavelength of approximately 2.1 µm, an Ho-laser with operating wavelength between approximately 2.05 µm and 2.1 µm, a Tm-laser (thulium-laser), for example a Tm-YAG laser with an operating wavelength of approximately 2.01 µm, an Er-YAG laser (erbium-YAG laser) with operating wavelength of approximately 2.94 µm, an $Er^{3+}$:$CaWO_4$-laser with operating wavelength of approximately 1.61 µm, an $Er^{3+}$:YAG-laser with operating wavelength from approximately 1.64 µm to approximately 2.94 µm, an $Ho^{3+}$:YLF-laser with operating wavelength of approximately 2.06 µm, an $Ho^{3+}$:$CaWO_4$-laser with operating wavelength of approximately 2.09 µm, a $Tm^{3+}$:$CaWO_4$-laser with operating wavelength of approximately 1.91 µm, an Tm³⁺: YAG-laser with operating wavelength of approximately 2.01 µm, an Er³⁺—fibre laser with operating wavelength from approximately 1.53 µm to 1.6 µm, a Tm³⁺—fibre laser with operating wavelength from approximately 1.75 µm to 2.1 µm or optical parametric oscillators (OPO) that can, for example, operate for emission wavelengths $\lambda=1.1$ µm to approximately $\lambda=4.0$ µm.

The invention also relates to an optical element which can be or is produced with the aid of the method and/or the apparatus. In particular, what is involved here is an optical element having a substrate consisting essentially of a plastics material that is transparent in the visible spectral region, in particular a spectacle lens, a contact lens or an intraocular lens. The optical element can also be a film-like substrate for light-emitting or absorbing components, for example for organic light emitting diodes (OLEDs) or solar cells. A region with a structure or mark is provided on an optical surface of the substrate. The optical element is characterized in that the structure has raised structural elements generated by laser-radiation-induced local increases in volume.

It is possible to form on the surface of the substrate a plurality of raised structural elements which are juxtaposed in a lattice arrangement and respectively form a lens of a micro-lens array.

In addition to the claims, the above features and further ones also emerge from the description and the drawings, it being possible for the individual features to be respectively implemented on their own or severally in the form of sub-combinations for embodiments of the invention and in other fields, and for them to represent advantageous designs capable of protection for themselves.

DETAILED DESCRIPTION OF THE PREFERRED EMBODIMENT

Figure 1:
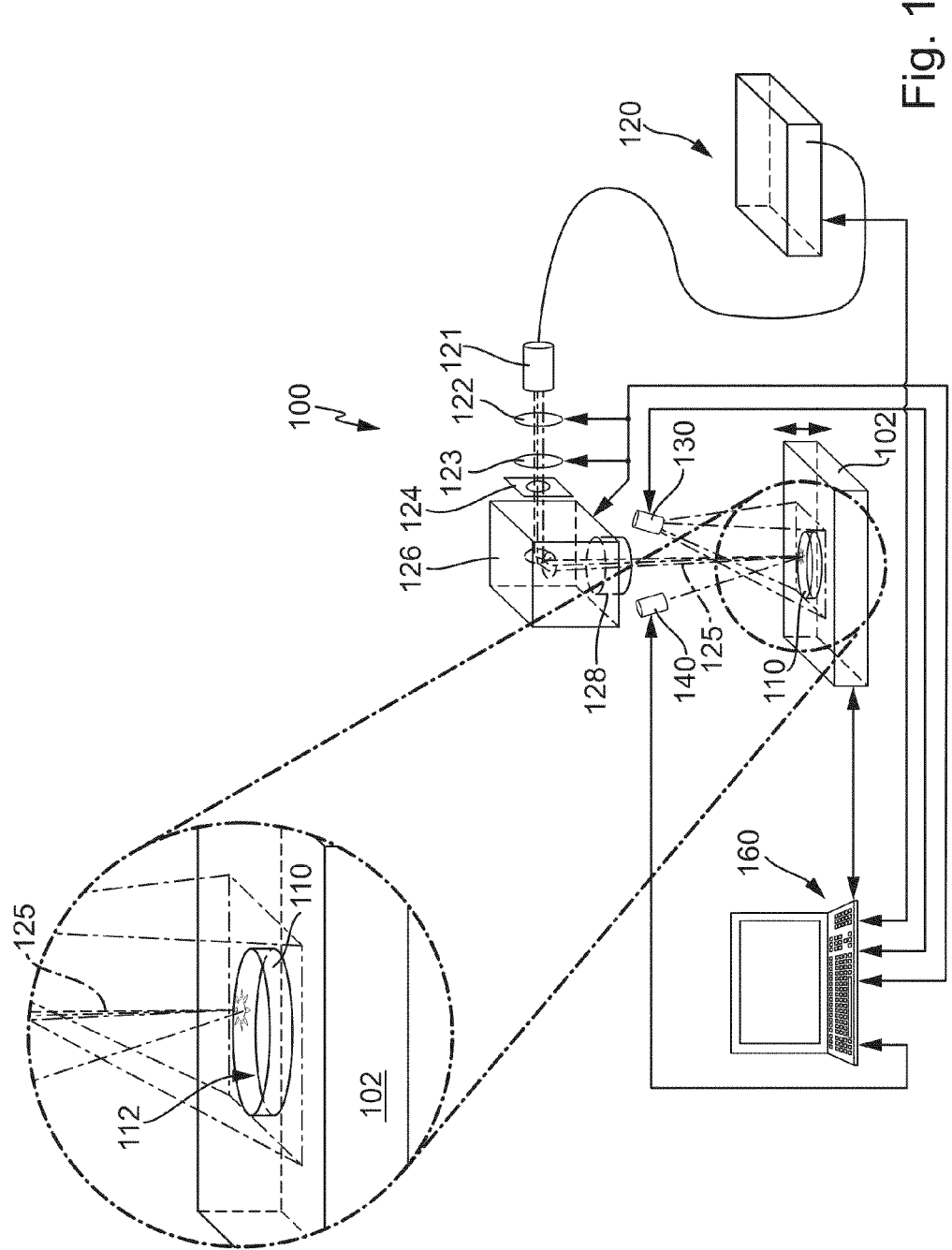
FIG. 1 shows a schematic illustration of an essential component of a laser marking apparatus for marking optical elements with the aid of suitably shaped laser radiation.

FIG. 1 shows a diagrammatic illustration of essential components of an apparatus 100 for marking optical elements with the aid of suitably shaped laser radiation. The apparatus, which is also referred to below as a laser marking apparatus 100, is a laser microprocessing system which is designed as a table appliance and whose components are specifically designed for the requirements in spectacle lens marking and coordinated with one another. Other optical elements, for example contact lenses or moulds for contact lenses, can also be marked.

A lifting table 102 which can be driven by an electric motor in a z-direction and serves as substrate holder for holding at least one optical element 110 (substrate) on its top side serving as substrate holding surface is mounted on a machine bed supported so as to damp vibrations and which is, for example, a granite plate (not shown).

Furthermore, the apparatus 100 has a laser system with a laser radiation source 120 and, fitted thereto, a beam guiding system 124 for guiding the laser radiation and for producing a laser beam 125 which can be aligned with an upwardly directed optical surface 112 of the optical element.

In the case of the experiments not illustrated in more detail below, use was made of a largely maintenance-free and cost-effective fibre laser 120. What was involved here was a non-Q-switched cw laser whose "pulse length" was generated directly via the power regulation of the laser. In the case of a 5 kHz clocking, up to 20 pulses were generated in order to generate a single structural element (dot) of a mark, and this signifies typical processing periods of the order of magnitude of 4 ms for a structural element of a mark.

The laser beam expanded with the aid of a beam expander 121 passes through a shutter 122, which can be operated under computer control, and an attenuator 123, which can likewise be set under computer control, and is subsequently deflected by the mirror arrangement of a galvanometer scanner 126 in the direction of a focusing optics 128 which, in the case of direct structuring, focuses the laser beam onto a location in a marking region of the surface of the optical element that is to be marked or, in the case of the mask projection method, projects an image of a mask into the marking region. If—as in the case of the experiments illustrated here—the laser is brought to emit directly, it is possible to dispense with the shutter and/or with the attenuator. If a mask 124 is used, it is to be arranged in the object plane of the focusing optics 128.

As a telecentric f-theta optics, the focusing optics 128 is adapted to the deflecting range of the galvanometer scanner and the characteristics of the incident laser beam in such a way that the focused laser beam or the sharp image of the mark essentially has the same beam characteristics inside a two-dimensionally extended working area on the substrate surface at each focusing position. The f-theta optics therefore ensures that the focal region of the deflected laser beam moves on a plane and not on a spherical surface. The height adjustment of the lifting table is used to position the latter for processing such that the focal plane or the mask projection plane coincides with the surface to be irradiated. Alternatively or in addition, the scanner could be moved relative to the workpiece.

An observation system which comprises a surface camera 130 which can be aligned with the substrate surface is provided for supporting exact beam positioning or the focusing of the mask image on the substrate surface. A positioning system for exact positioning of the substrate with reference to the laser beam comprises a ranging sensor 140 for detecting the exact position of the substrate surface. In this embodiment, the laser ranging sensor 140 is used in conjunction with an automatic focusing process. Alternatively or in addition, it is also possible to use a mechanical (tactile) ranging sensor.

For example, the apparatus 100 can be used to carry out a marking method for a spectacle lens or another optical element as follows.

Firstly, an optical element to be marked is mounted on the lifting table in a processing position. The optical observation system is then used to generate a digital image of the mounted optical element on the display screen of the control and operating unit 160. With the aid of this digital image, the object to be marked can be aligned by the operator, and the relative position of the mark to be generated can be defined with reference to reference points. The non-permanent reference points can be applied in advance, for example in a printing method by means of ink jet.

Thereafter, an automatic focusing procedure is run through in order to bring the optical element into an optimum vertical processing position. To this end, the laser distance meter 140 (or a tactile ranging sensor) detects the position of the substrate surface to be processed, and the lifting table 102 is driven in such a way that the provided marking region of the optical element is brought into the optimum vertical processing position onto which the laser beam can be focused or projected. It is also possible to detect a plurality of positions for example in the case of multifocal lenses. By way of example, the lens is moved laterally, or the sensor 140 is tilted, to this end. It is also possible to move the scanner with the aid of optics. A dimensional interpolation between the measured positions can then be carried out, as a result of which it is possible to determine the focal position for all sites of a possibly complexly cambered surface of an optical element.

There is then directed onto the optical element a laser beam 125 which is generated by the laser beam source 120 and is configured, if appropriate by the beam expander 121 and the attenuator 123, with regard to its absolute intensity and to the intensity distribution such that the specific optimum processing conditions are set for the material of the optical element.

The galvanometer scanner 126 is then used to deflect the laser beam under computer control with high dynamics and high precision. In this process, the laser beam is directed onto the marking region by the f-theta objective 128. A control computer of the control and operating unit 160 then directs the laser beam from the galvanometer scanner 126 onto the position corresponding as stipulated to a marking, and a laser pulse of suitable length is triggered by driving the laser or the shutter. Relevant parameters such as the pulse repetition number and the intensity of the laser radiation have also been input and fixed for the process in advance via the operator interface of the control and operating unit. The intensity can be prescribed, however, by setting the attenuator 123 or—as in the case of the experimental laser—by selecting the pulse energy directly at the laser. In accordance with the stipulations for the mark to be generated in the optical element a deflection of the galvanometer scanner is then performed under computer control and, if appropriate, the laser 120, the attenuator 123 or the shutter 122 are driven in order to provide as time elapses the laser intensity required to generate the mark.

The galvanometer scanner can also be used in the mask projection method, for example when the mask has a single circular or otherwise shaped cutout which is imaged onto the surface of the optical element with the aid of the f-theta optics used as projection optics.

Figure 2:
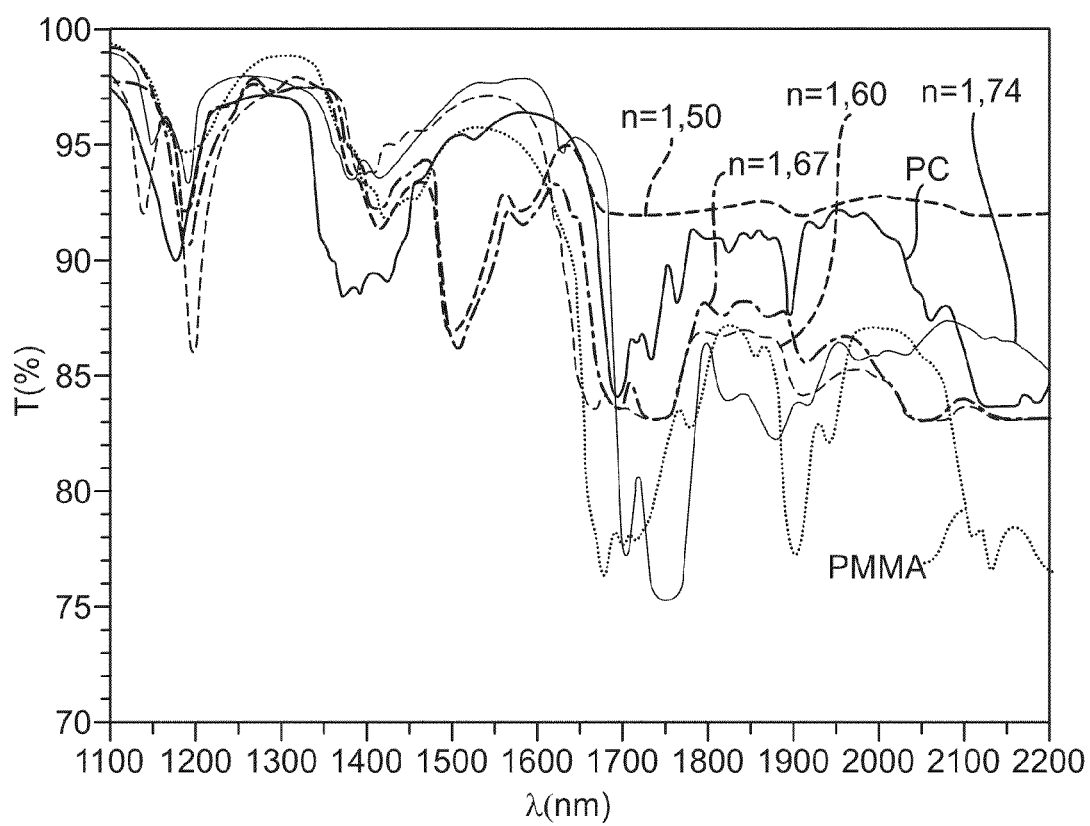
FIG. 2 shows comparative diagrams for the dependence of the transmittance T on the wavelength λ for various plastics materials transparent in the visible spectral region.

Experiments were carried out on different materials customary for spectacle lenses, contact lenses or intraocular lenses. FIG. 2 shows in a comparative diagram the transmission spectra of various materials, that is to say the dependence of the transmittance or the transmission T [%] on the wavelength $\lambda$ [nm] between approximately 1100 nm and 2200 nm. The transmission spectra are shown for polycarbonate (PC), polymethyl methacrylate (PMMA), and for a plastic glass which can be made available by varying the composition with different refractive indices n, for example with n=1.50, n=1.60, n=1.67 and n=1.74.

The transmittances T specified in FIG. 2 result from measurements with an NIR (near infrared) spectrometer in the so-called transflexion method. During the measurements, after a first penetration of the transparent measurement object a measuring beam of output intensity $I_0$ is reflected on a mirror surface and returned so that it penetrates the measurement object a second time. The transmittance T is then yielded from the ratio between the intensity $I_1$ after two-fold penetration to the output intensity, in accordance with $T=I_1/I_0$. The spectra were normalized to an effective overall material thickness of 1 mm.

Marking experiments were carried out using the direct structuring method. In this case, use was made as laser radiation source of a thulium-doped fibre laser with operating wavelength $\lambda=1.908$ μm the radiation of which was focused onto the surfaces of the samples by means of an f-theta optics, in order to generate an irradiation spot with a diameter of approximately 30 μm to 100 μm on the sample surface. The laser pulse repetition rate lay in the kHz range at approximately 5 kHz. For all the irradiated plastics materials, it was possible after a short irradiation period (typically less than 4 ms per individual structural element) to generate round structural elements of the mark, the type and the dimensions of the structural elements being set by an appropriate number of pulses.

Surprisingly, operating wavelengths in the near infrared region can be used to produce excellently defined marks or structures of prescribable shape and size, although in the wavelength region used, the irradiated materials have merely a partial absorption with transmittances substantially above 70%, in particular between approximately 80% for the highest-index plastic glass (n=1.74) up to virtually 92% for the low-index plastic glass (n=1.50). Polycarbonate, which has a transmission between 85% and 90% in the wavelength region of interest, can also be excellently structured.

These results signify a departure from the commercial mode of procedure in which an attempt has been made to operate in a fashion far removed from the visible spectral region in the region of wavelengths for which the irradiated materials have a very low residual transmission of, for example, less than 30% or below. It is assumed that in the case of laser processing in the region of partial absorption, for example between approximately 70% and approximately 95% (having a material thickness of 1 mm), it is possible to attain a compromise, advantageous for structuring, between the optical penetration depth, on the one hand, and the possibility of exceeding the material-specific limiting fluence (modification threshold), on the other hand, in order to generate marks of defined shape and size in an efficient marking process.

A further particular feature consists in that within the scope of the invention and given the observance of certain conditions for beam shaping and beam parameters, it is possible to generate on the surface of transparent plastics materials structures having structural elements which are raised by comparison with the non-irradiated surroundings, that is to say which project upwards over the non-irradiated and therefore unmodified surroundings. By comparison with conventional marking by removal of material (ablation), this signifies a paradigm shift away from ablating structuring towards the modification in which material is raised or volume is increased and which can be carried out essentially without removal of material and possibly also without disadvantageous ablation products (debris).

Figure 3A:
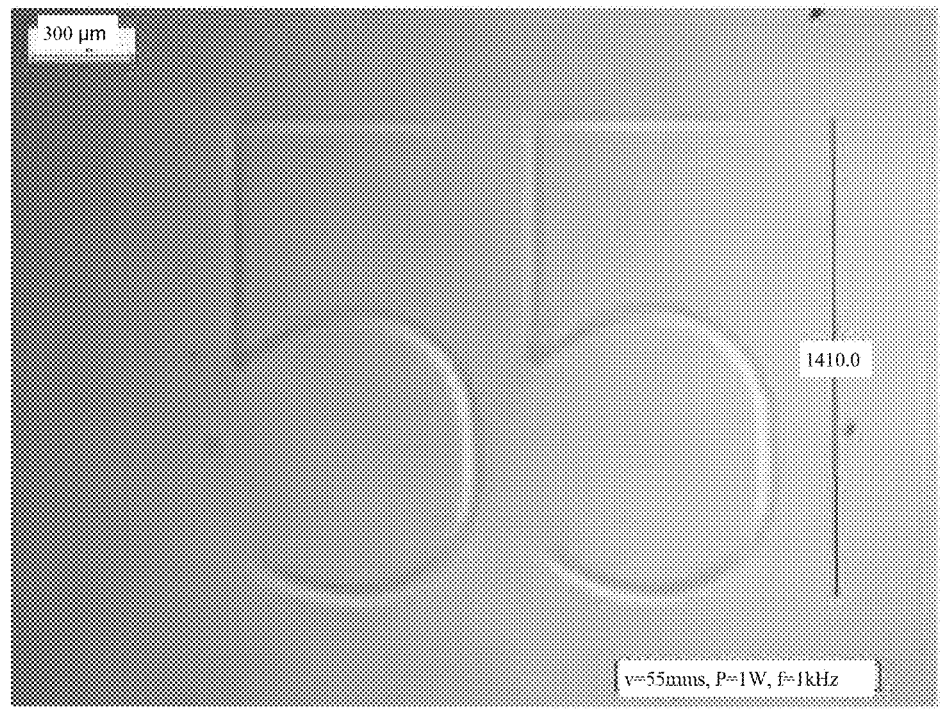
FIG. 3 shows in 3A an optical micrograph of a laser-induced mark with linear structural elements, and in 3B an optical micrograph of a laser-induced mark with circular structural elements (dots) after irradiation with 12 pulses (left) and 13 pulses, respectively.

FIGS. 3 to 5 are used to explain types of method with which substrates, consisting of plastics material, for optical elements are irradiated with laser radiation in a region of defined size in such a way that an increase in volume or reduction in thickness induced by laser radiation is generated in the irradiated near-surface region, this laser-induced increase in volume may be performed substantially without removal of material. It is possible in this way to generate in the marking region or structuring region raised structural elements which rise above the adjacent, non-irradiated regions. FIG. 3A shows an optical micrograph of a marking region, in which the mark represents the number "55", the two numerals respectively being present in the form of lines which appear continuous. The linear structural elements were generated in conjunction with a feed rate of 55 mm/s for the laser beam compared with the substrate, use being made of laser radiation of 1 watt output power, and of a pulse frequency of 1 kHz.

Figure 3B:
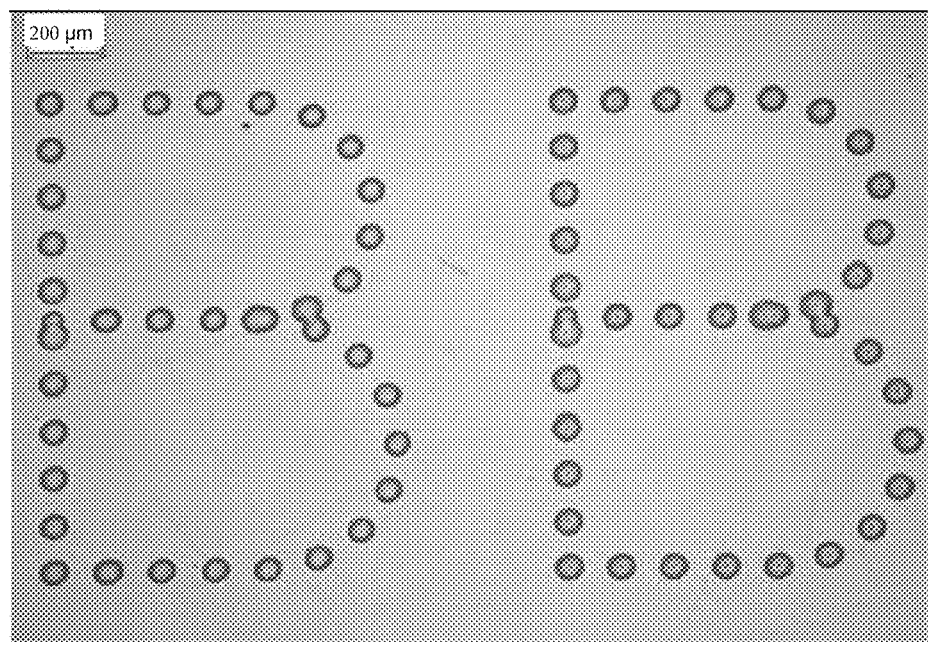

In the case of one of the numerous possible alternatives, FIG. 3B shows two marks which respectively represent the letter "B", which is respectively formed by rows of substantially circular or punctiform structural elements which are also denoted as dots. The substrate material is here a transparent plastic of refractive index n=1.60. In order to produce the "B" shown on the left, use is made of 12 pulses, and the "B" shown on the right resulted after 13 pulses and a correspondingly higher deposited laser power density. The lateral extents of the structures (line width in FIG. 3A and diameter of the dots in FIG. 3B, respectively) is in both cases between approximately 50 µm and approximately 100 µm, and so the marks can still just be visible to the naked (unaided) eye.

What is chiefly conspicuous in the case of the dot structures in FIG. 3B is that dark points respectively appear in the middle of the round structural elements shown on the right, but are not to be detected in the case of the left-hand structure. The significance of this phenomenon is explained below with the aid of FIG. 4.

Figure 4A:
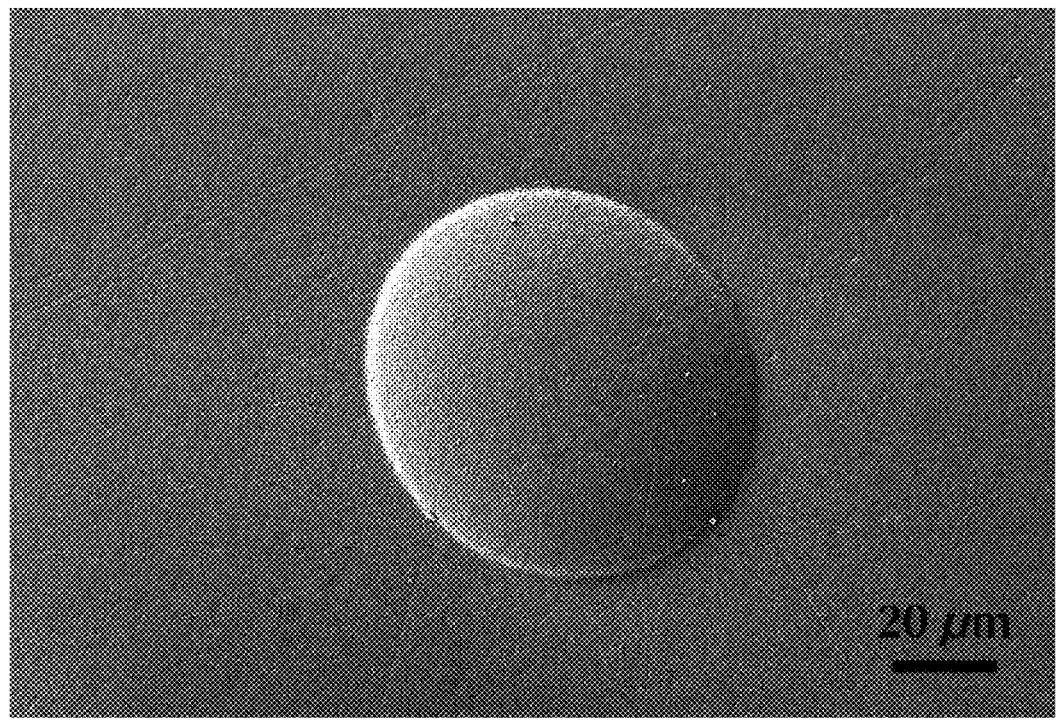
FIG. 4 shows scanning electron micrographs of punctiform or circular structural elements on an optical surface of a plastic substrate after irradiation with different numbers of pulses.
Figure 4B:
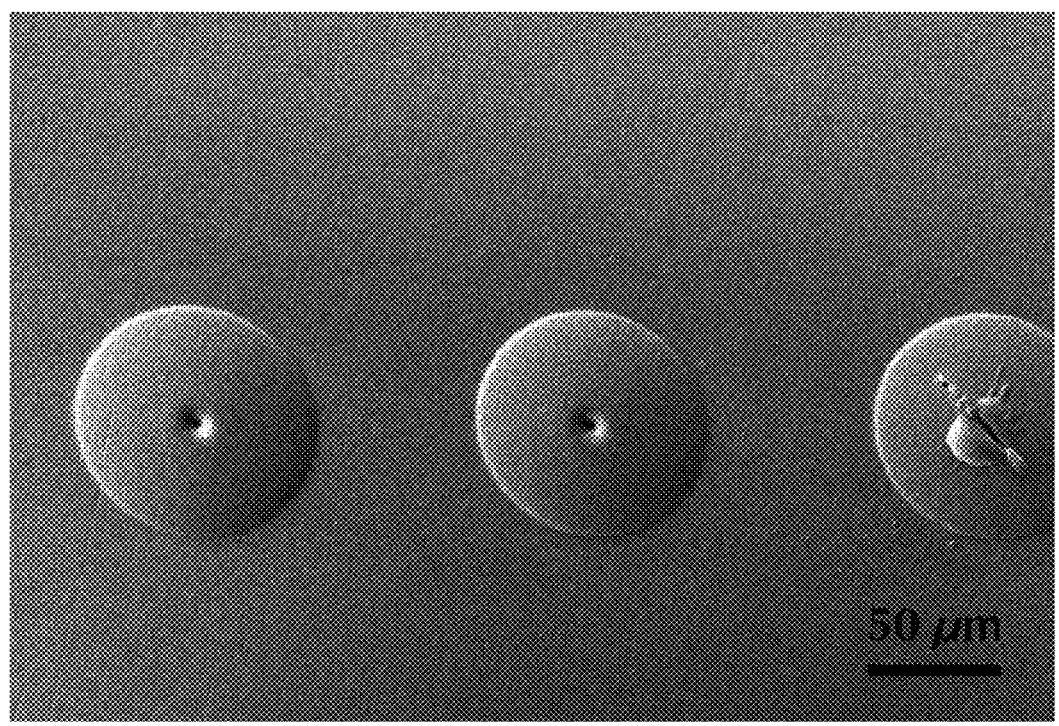
Figure 4C:
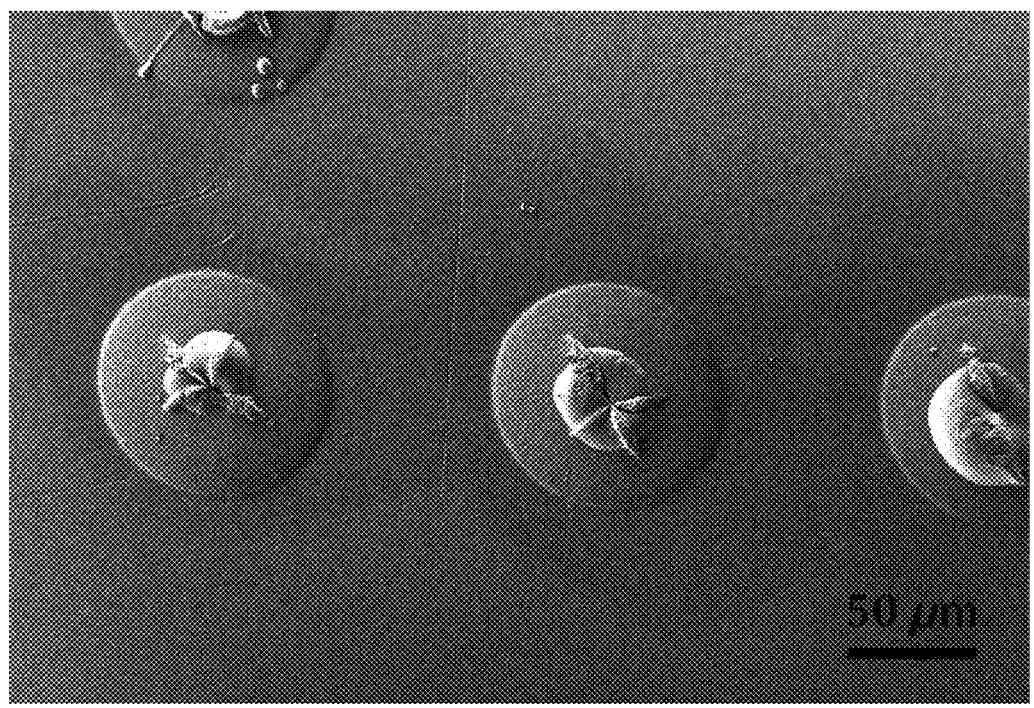
Figure 4D:
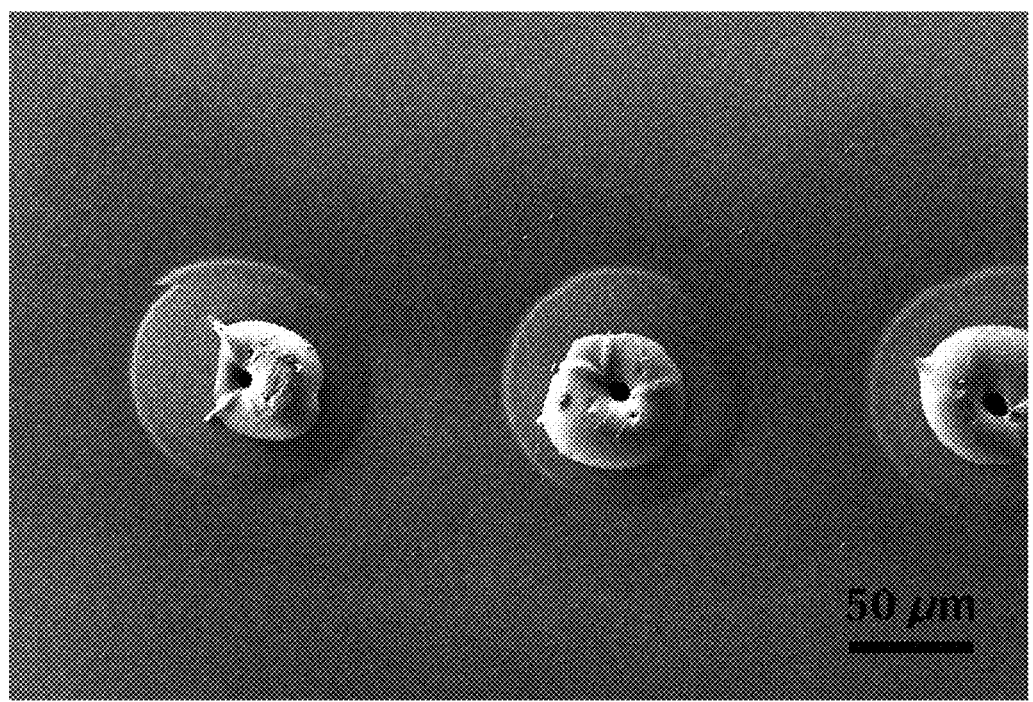

FIG. 4 shows scanning electron micrographs of circular structural elements on the surface of a plastic substrate of refractive index n=1.60 after irradiation periods of different length or after different numbers of pulses, specifically after 8 pulses in FIG. 4A, after 12 pulses in FIG. 4B, after 13 pulses in FIG. 4C and after 14 pulses in FIG. 4D. It is to be seen in FIG. 4A that a raised structural element in the form of a convex lens with a diameter of approximately 80 µm has formed on the optically smooth surface of the plastic substrate. The interferometrically determined maximum height of the lens is approximately 4 µm in the central region. In any case, in the irradiated region the surface is undamaged in the case of the high resolution shown, and curves continuously over the region of the plastics material lying therebelow. This near-surface zone evidently has experienced a local increase in volume during the laser irradiation, and this results in the upwardly directed camber over which the surface extends in the manner of a smooth skin. It is assumed that the polymer material of the plastic changes irreversibly under the influence of the laser radiation in conjunction with a decrease in density such that the surface lens shown remains after termination of the irradiation. Whether and to what extent the plastics material partially fuses in the irradiated region of the volume below the undamaged surface is the subject matter of current investigations.

It is to be seen in FIG. 4B that small holes appear to form on the surface of the raised structure upon further irradiation of laser energy, it being evident on the right-hand structural element that the liquid plastics material penetrates onto the surface from a central slit. The emergence of partially liquid plastics material from a surface opening in the centre of the structural element with increasing irradiated laser energy is well in evidence from FIGS. 4C and 4D. In the case of the selected pulse energy and pulse period, the limit of the irradiation which leads to a still undamaged surface is clearly between 8 and 12 pulses (compare FIG. 4A and FIG. 4B).

All the structural elements shown in FIGS. 4A to 4D are outstandingly suitable for marks. The raised structural element shown in FIG. 4A forms a convex lens which can also be used as a micro-optical element, specifically as a micro-optical positive lens. It is evident that a plastic substrate can also be irradiated in a multiplicity of juxtaposed irradiation regions in such a way as to form a microlens array with a multiplicity of juxtaposed raised structural elements which respectively form a lens of a microlens array. It is possible in this case for a one-dimensional lens array with a straight or curved line of individual lenses to be involved. It is also possible for the individual structural elements to be arranged in a two-dimensional lattice arrangement in fashion which more or less fills the surface, in order thereby to form a two-dimensional microlens array. Such optical elements can be used, for example, for the purpose of beam homogenization in beam guidance systems (compare FIG. 6).

Lens elements with a shape deviating from the circular shape, for example lenses which are square or hexagonal or polygonal in some other way, can also be generated by suitable beam shaping of the laser beam used in the structuring. Cylindrical lenses can also be generated.

Figure 5A:
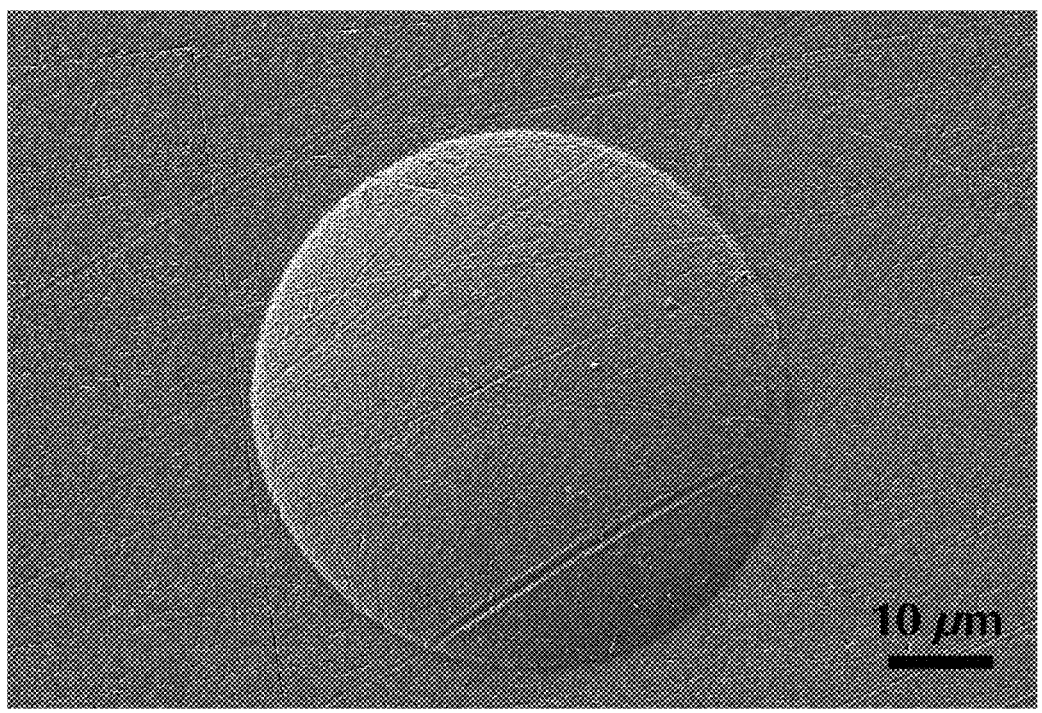
FIG. 5 shows two scanning electrode micrographs of linear structural elements generated by laser irradiation, on an optical surface of a plastic substrate.
Figure 5B:
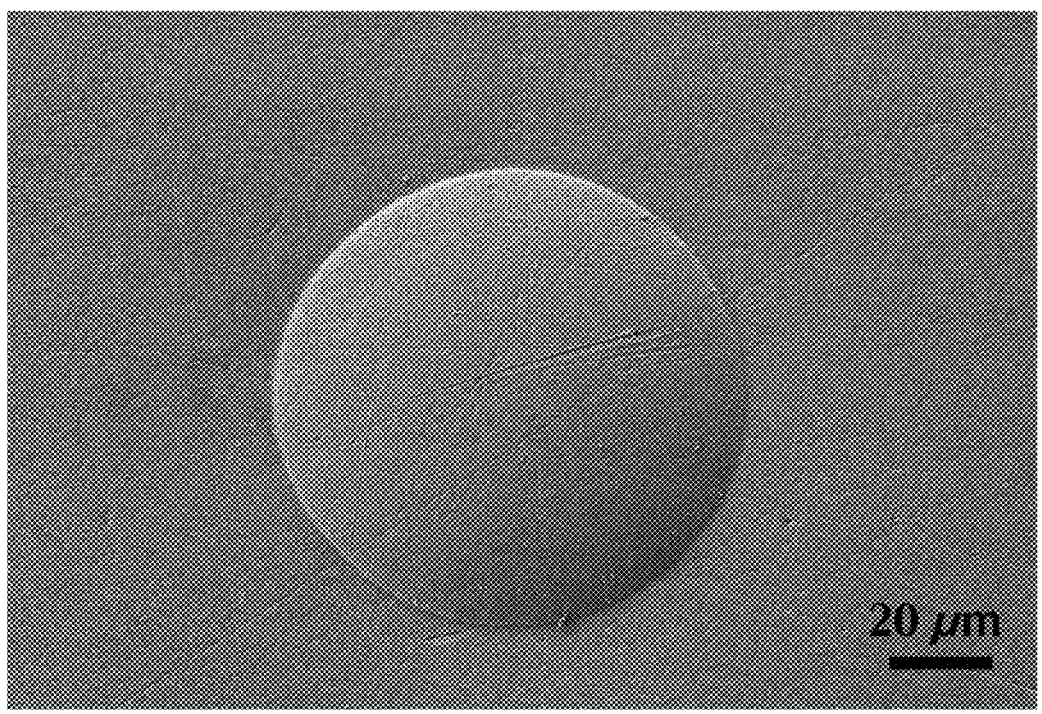

FIGS. 5A, 5B serve by way of example as proof that other plastics materials can also be structured in the way shown in order to generate lens elements. In the case of this example, the substrate consists of a plastic of refractive index n=1.67. Located on the irradiated surface, prepared with optical quality, in the region of the upper and of the lower marking dots are small scratches from the curved course of which in the region of the lens element it is possible to detect the raised nature of the structural element. It is particularly evident from FIG. 5A that the scratch visible in the lower left-hand region on the surface in the region of the lens element is somewhat expanded, thus proving that the surface extending over the region of increased volume is slightly stressed such that the crack opens up a little. The surface tension in the irradiated region leads to the formation of a continuously curved surface of optical quality which is suitable as a lens surface.

Figure 6:
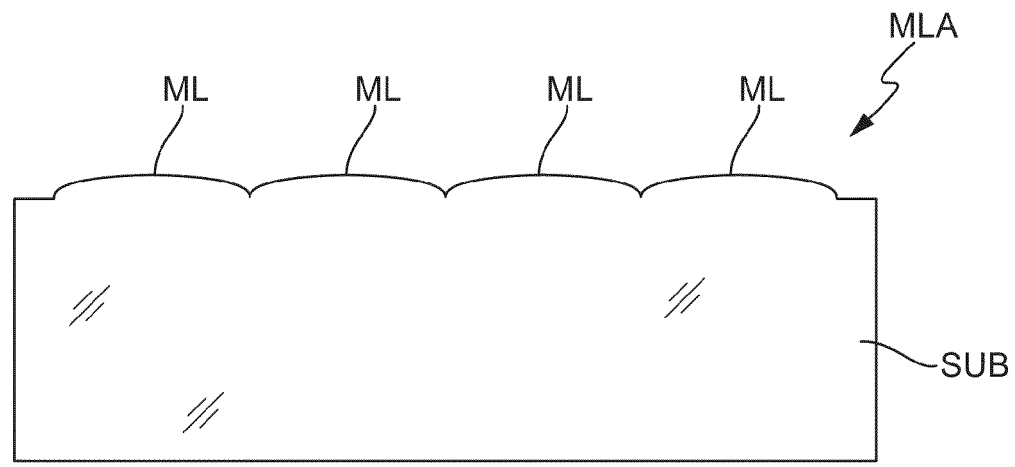
FIG. 6 shows a diagrammatic sectional illustration through a series of microlenses of a microlens array whose individual lenses have been generated by local irradiation of a plastic substrate.

FIG. 6 shows by way of example a diagrammatic section through a series of microlenses ML of a microlens array MLA generated with the aid of the method. During production, the surface O of the plastic substrate SUB was irradiated with laser radiation in such a way that local near-surface swellings arose which led to the formation of lenses.

Figures 7A, 7B:
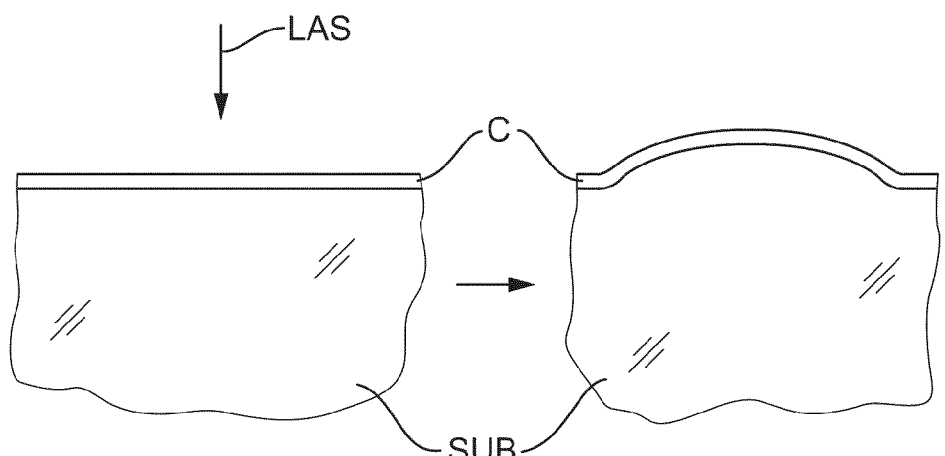
FIG. 7 shows a sectional illustration through a coated substrate before and after laser irradiation for the purpose of generating a microlens.

The raised structural elements were generated on an uncoated surface of an optical element in the case of the example from FIG. 6. With the aid of FIG. 7 a method variant is explained in the case of which the surface, prepared with optical quality, of the optical element is firstly provided with an inorganic coating C covering the region to be structured (FIG. 7A). What can be involved is, by way of example, an anti-reflection coating and/or a wear protection layer, in order to increase the scratch resistance. The coated surface is irradiated thereafter locally with laser radiation LAS of given wavelength. The operating wavelength is selected such that the material of the coating C is substantially free of absorption and therefore is not heated up or modified or ablated, or is scarcely so affected. The material of the plastic substrate SUB, by contrast, exhibits a partial absorption in the region of the operating wavelength, for example with a transmittance T between approximately 70% and approximately 90%. Raised laser-induced marks or structures are generated through the coating by the irradiation via a laser-radiation-induced volumetric expansion of the irradiated plastics material volume (FIG. 7B). Given suitable selection of the irradiation parameters (for example wavelength, intensity, irradiation period), it is possible in this case for the raised structural elements to form without the coating becoming cracked or peeling off, the result therefore being coated raised structural elements which can, for example, serve as lenses of a lens array or as marking elements of marks of ophthalmic substrates which have already been provided with high-quality surfaces.

In the case of the variant described in conjunction with FIG. 1, the lifting table, which can be moved vertically, (that is to say in the z-direction), ensures in combination with the galvanometer scanner and the f-theta objective that for each location of a provided marking structure the laser beam lies sufficiently accurately in the focal region of the laser beam or in the mask projection plane which is optically conjugate with the mask, even given a curved substrate surface.

One variant of the above-described apparatus for introducing a near-surface mark into an object that is transparent in the optical spectral region is the use of a so-called variable galvanometer scanner which, in addition to deflection in the horizontal x- and y-directions, also enables a displacement of the focal region or of the mask projection plane parallel to the z-direction such that as the mark is being generated it is possible to focus without the need to use a z-lifting table in the case of flat and curved substrate surfaces.

A further variant provides that below a fixed optics a movement system that can be moved in x-, y- and z-directions is moved by the control unit 160, and the laser beam is switched on and off as a function of location, in such a way that the desired laser engraving takes place on the surface of the optical element that is transparent in the optical spectral region.

The use of laser radiation sources which emit in the near infrared region also enables advantageous indirect marking method. Water has a region of strong absorption in the near infrared region greater than 1.450 µm. This can be used for the purpose of laser marking by vapour deposition of water onto the surface to be marked, or by applying water in another way such that a relatively thin water layer results. The optical element wetted in this way is then irradiated as described in the course of direct structuring or in the mask projection method. The absorption in the water layer results in local heat which leads to the desired permanent material changes in the substrate lying therebelow. After termination of the marking, the absorbing, water-containing auxiliary layer can be removed with ease and without residue. By way of example, a Tm laser comes into consideration as laser radiation source specifically for this method variant.

The experiments presented here by way of example were carried out with the aid of laser pulses of typical pulse periods in the range of microseconds (ms). It is also possible to use ultrashort pulse lasers which are capable of emitting laser pulses with typical pulse lengths in the range of picoseconds (ps) or in the range of femtoseconds (fs). It is possible in this case, if appropriate, for other interaction mechanisms to be active between laser radiation and substrate material.

The method can be used for the marking or structuring of different materials transparent in the visible spectral region, or optical elements produced, in particular for marking spectacle lenses, contact lenses or intraocular lenses. It is also possible to mark plastic lenses for multilens optical systems, for example for objectives. The method can also be used to produce microlenses or microlens arrays.

Moulds for contact lenses or spectacle lenses can also be marked when these consist of transparent plastics material with suitable partial absorption. In this case, it is possible to generate on a polished surface of optical quality which is provided for shaping the front or rear side of a lens a mark with defined elevations which lead after the moulding process to recessed marking structures on the finished optical element.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all changes and modifications as fall within the spirit and scope of the invention, as defined by the appended claims, and equivalents thereof.

What is claimed is:

1. A method for producing a permanent mark in an optical element which consists essentially of a material that is transparent in the visible spectral region, the method comprising:
   irradiating a marking region of the optical element with laser radiation to generate local, near-surface material changes in such a way that a mark of prescribed shape and size is generated;
   wherein the laser radiation has an operating wavelength $\lambda$ from the wavelength region between 1.1 µm and 9.2 µm;
   the operating wavelength being selected such that the material of the optical element exhibits a partial absorption with a transmittance between 60% and 98%.

2. The method according to claim 1, wherein the operating wavelength is selected such that the material of the optical element exhibits a partial absorption with a transmittance between 75% and 95%.

3. The method according to claim 1, wherein the laser radiation has an operating wavelength $\lambda$ from the wavelength region between 1.5 µm and 5.0 µm.

4. The method according to claim 1, wherein the material of the optical element is a plastics material suitable for ophthalmic substrates.

5. The method according to claim 4, wherein the plastics material is selected from the group consisting of polycarbonate, polymethyl methacrylate, acryl, and water-containing acryl.

6. The method according to claim 1, wherein the optical element consists essentially of a plastics material at least in a region to be modified, and wherein beam parameters of the laser radiation are set in such a way that a laser-induced increase in volume is generated in the irradiated near-surface region.

7. The method according to claim 6, wherein the laser-induced change in volume takes place substantially without removal of material.

8. The method according to claim 6, wherein raised structural elements are generated in the marking region adjacent to non-irradiated regions.

9. The method according to claim 8, wherein the raised structural elements are generated with a substantially undamaged surface extending over a region of increased volume in a continuously curved fashion.

10. The method according to claim 1, wherein the optical element is firstly provided with a coating covering the marking region, and thereafter raised structural elements are generated through the coating.

11. The method according to claim 10, wherein the coating fulfils at least one of the following conditions: (i) the coating is substantially free of absorption for the operating wavelength; (ii) the coating is resistant to modification; and (iii) the coating consists essentially of inorganic material.

12. The method according to claim 10, wherein raised structural elements are formed under the coating substantially without destruction of the coating covering the raised structural elements.

13. The method according to claim 1, wherein a fibre laser is used as laser radiation source.

14. The method according to claim 13, wherein the fibre laser is selected from the group consisting of: a thulium-doped fibre laser, a holmium-doped fibre laser, and an erbium-doped fibre laser.

15. The method according to claim 1, wherein one of a spectacle lens, a contact lens and an intraocular lens is provided with a mark on a surface prepared with optical quality.

16. The method according to claim 1, further comprising:
generating one of a laser beam focused in a focal region, and a laser beam projected from a mask onto an illumination spot;
irradiating a marking region of the optical element to be irradiated with the laser beam to generate local, near-surface material changes; and
generating a relative movement between the optical element and the laser beam such that the laser beam sequentially irradiates different locations of the marking region, and a mark of prescribed shape and size is generated.

17. The method according to claim 1, further comprising:
influencing an intensity distribution of the laser radiation within the laser beam by beam shaping.

18. The method according to claim 17, wherein beam shaping is effected by at least one beam shaping element selected from the group consisting of: a contour mask, a grey-scale mask, a refractive optical element, and a diffractive optical element.

19. A method of using an apparatus comprising:
a substrate holder for holding an optical element; and
a laser system with a laser radiation source and a beam guiding system for guiding a laser beam onto a surface of the optical element;
for producing a permanent mark in an optical element which consists essentially of a plastics material that is transparent in the visible spectral region,
wherein the laser radiation source has an operating wavelength $\lambda$ from the wavelength region between 1.1 µm and 9.2 µm,
and wherein the operating wavelength is selected such that the material of the optical element exhibits a partial absorption with a transmittance between 60% and 98%.

20. The method according to claim 19, wherein a relative movement between the optical element and the laser beam is generated by a movement system in such a way that the optical element is irradiated by the laser beam at different sites of a marking region on the surface of the optical element.

21. The method according to claim 19, wherein the laser system comprises a mask and the laser beam is projected from the mask onto an illumination spot on the surface of the optical element.

22. The method according to claim 19, wherein an intensity distribution of the laser radiation within the laser beam is influenced by beam shaping effected by at least one beam shaping element selected from the group consisting of: a contour mask, a grey-scale mask, a refractive optical element, and a diffractive optical element.

23. An optical element comprising:
a substrate consisting essentially of a plastics material that is transparent in the visible spectral region, a structured region being provided on one optical surface of the substrate,
wherein a structuring in the structured region has raised structural elements generated by laser-radiation-induced local increase in volume of the plastics material in accordance with the method of claim 1.

24. Optical element according to claim 23, wherein the raised structural elements have a smooth surface which extends over a region of increased volume in a continuously curved fashion.

25. Optical element according to claim 23, wherein the optical element is one of a spectacle lens, a contact lens, and an intraocular lens.

26. Optical element according to claim 23, wherein the plastics material is selected from the group consisting of: polycarbonate, polymethyl methacrylate, acryl, and water-containing acryl.

* * * * *